United States Patent [19]
Weiler

[11] Patent Number: 5,893,686
[45] Date of Patent: Apr. 13, 1999

[54] PIPE TAPPING DRILL ATTACHMENT

[76] Inventor: Donald R. Weiler, 16792 Talisman St. c-211, Huntington Beach, Calif. 92649

[21] Appl. No.: 08/968,754

[22] Filed: Aug. 27, 1997

[51] Int. Cl.[6] .................................................. B23B 39/00
[52] U.S. Cl. ........................ 408/97; 137/315; 408/72 R; 408/92
[58] Field of Search ............................. 408/72 R, 87, 408/92, 97, 95; 137/315, 317, 318

[56] References Cited

U.S. PATENT DOCUMENTS

| | | |
|---|---|---|
| 160,952 | 3/1875 | Quinn . |
| 438,740 | 10/1890 | Eley . |
| 1,603,537 | 12/1926 | Hathaway . |
| 2,601,434 | 6/1952 | Bois ........................ 408/87 |
| 2,870,629 | 1/1959 | Willis ....................... 408/87 |
| 3,272,033 | 9/1966 | Leopold, Jr. et al. ..... 408/87 |
| 3,773,067 | 11/1973 | Ray ........................ 137/318 |
| 3,827,448 | 8/1974 | Alba ........................ 137/15 |
| 3,847,501 | 11/1974 | Doty ....................... 408/108 |
| 3,870,431 | 3/1975 | Luckenbill et al. ..... 408/111 |
| 3,995,655 | 12/1976 | Sands ...................... 408/67 |
| 4,431,017 | 2/1984 | Willemsen ............... 137/15 |
| 4,902,174 | 2/1990 | Thompson et al. ..... 408/101 |

FOREIGN PATENT DOCUMENTS

| | | | |
|---|---|---|---|
| 734691 | 5/1966 | Canada .................. 137/340 |
| 3808674 | 9/1988 | Germany ................. 408/92 |

*Primary Examiner*—Andrea L. Pitts
*Assistant Examiner*—Adesh Bhargava
*Attorney, Agent, or Firm*—Steven E. Kahm

[57] ABSTRACT

This invention relates to a housing having a shaft with a drill bit for tapping a pressurized fluid pipe. A saddle having a valve is attached to a pipe. A housing having a shaft passing therethrough is threaded to the valve. A drill bit is attached to one end of the shaft and a drill is connected to the other end of the shaft. The housing has a chamber in which the drill bit is retracted before connecting the housing to the valve. With the valve in the open position, the shaft is extended until the drill bit engages the pipe. The drill rotates the drill bit and cuts a hole in the pipe. The housing is sealed such that fluid entering the housing chamber does not escape along the shaft. The shaft and drill bit is then withdrawn into the housing chamber and the valve closed. The housing is then removed from the valve and a branch pipe connected thereto. The valve is then opened to fluidly connect a branch.

6 Claims, 2 Drawing Sheets

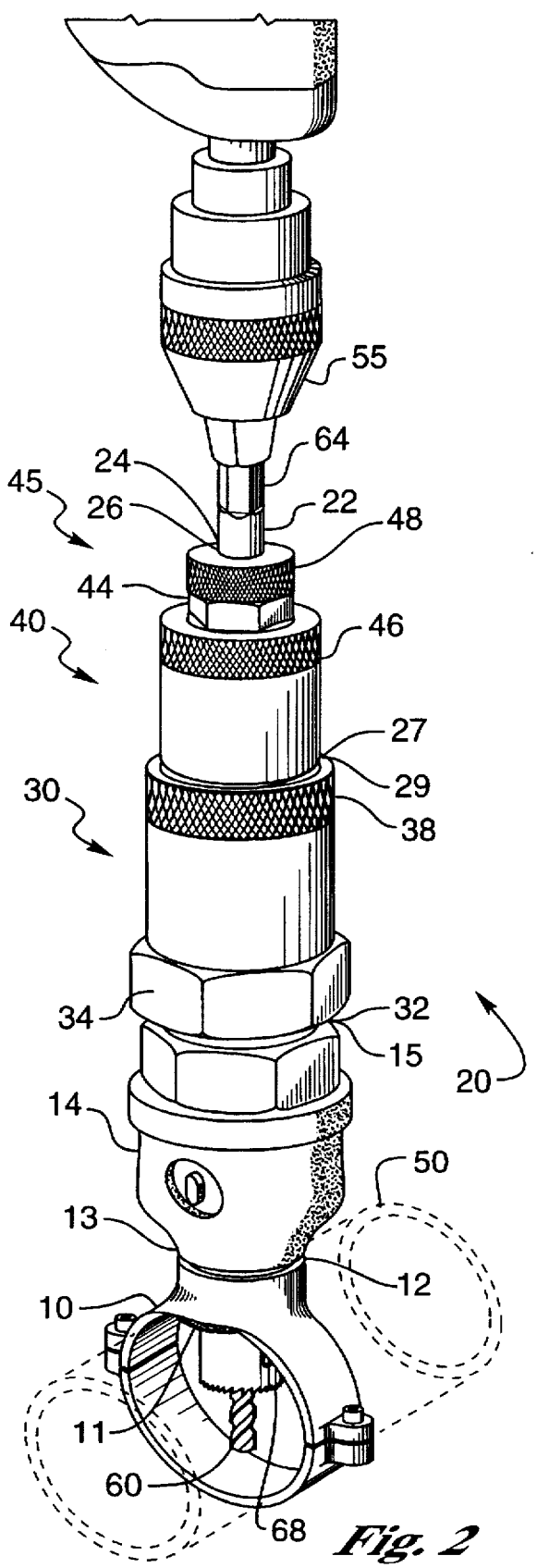
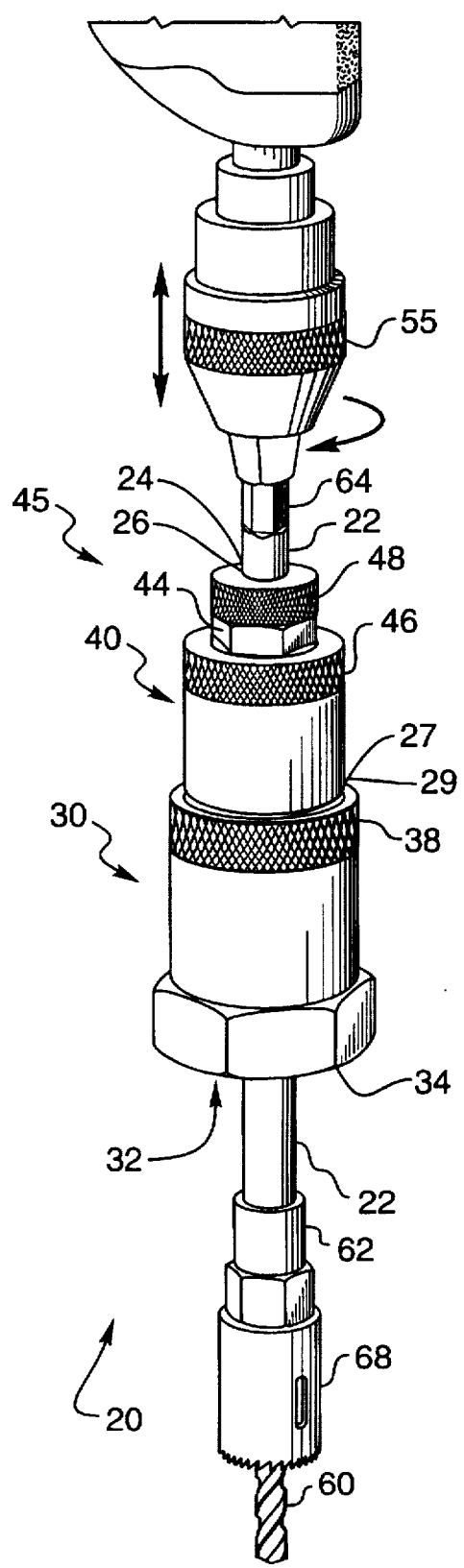

PIPE TAPPING DRILL ATTACHMENT

BACKGROUND OF THE INVENTION

1. Field of the Invention.

The invention relates to a fluid tight attachment, used on a valve, for tapping pressurized fluid pipes with a hand held drill.

2. Description of Related Art

It is frequently necessary to connect a branch pipe to a main pipe. This necessitates drilling a hole in the main pipe to form the entrance to the branch pipe. The process is known as tapping.

Many devices have been used in the past to tap into pressurized fluid lines. Typically these devices use a saddle to firmly attach a valve to the pipe to be tapped. A housing is threaded to the valve. The housing contains a drill bit for making an aperture in the wall of the pipe to be tapped. The shaft of the drill bit passes through a seal in the housing such that fluid cannot escape from the housing after the pipe is tapped. The drill is rotated by a first mechanism on the housing to cut through the wall of the pipe, and advanced axially by a second mechanism to apply pressure to the tip of the drill bit as it engages the pipe. When the drill bit has made an aperture in the wall of the pipe the drill bit is withdrawn into the housing by the second mechanism and the valve closed. The housing is removed from the valve, the branch piping is connected, and the valve is then opened to permit fluid to flow in the branch pipe.

Generally the housings in the past have been long, heavy, and complex. The mechanisms for rotating and advancing the drill bit add to the weight and length of the device, while adding to the cost.

SUMMARY OF THE INVENTION

The invention provides an easy to use attachment to a valve for tapping pressurized fluid pipes. A saddle is attached to the pipe to be tapped. The saddle includes a valve attached thereto for allowing a connection to a branch pipe.

A union portion of the housing, having a first threaded end which fits the threads on the valve, is threaded onto the valve. A gland portion of the housing is connected to the union portion of the housing. The gland portion of the housing has a bore to pass a shaft therethrough. The shaft has a hole saw, alternatively including a pilot drill bit attached at one end for cutting through the pipe, and a chucking stub for connecting a hand held drill at the other end. The shaft can be axially advanced without mechanical assistance by means of the user pushing forward on the drill. The gland portion of the housing has seals, such as o-rings, for guiding the shaft and making a fluid tight seal, while allowing the shaft to be rotated and moved axially.

OBJECTS OF THE INVENTION

It is an object of the invention to tap a pressurized fluid pipe by use of a hand held drill.

It is a further object of the invention to provide a low cost attachment for valves allowing tapping by hand held drills.

It is also an object of the invention to provide a light weight housing attachment for valves allowing tapping by hand held drills.

It is still a further object of the invention to provide a short housing attachment for valves allowing tapping by hand held drills.

It is another object of the invention to retain a slug in a housing cavity to prevent the slug from entering either pipe.

It is still another object of the invention to provide a separable housing union in order to apply the device to a variety of saddle valve sizes.

Other objects, advantages and novel features of the present invention will become apparent from the following detailed description of the invention when considered in conjunction with the accompanying drawings.

BRIEF DESCRIPTION OF THE DRAWINGS

FIG. 2 is an assembled perspective view of the pipe tapping drill attachment, shaft, pilot drill bit and hole saw.

FIG. 3 is an assembled perspective view of the pipe tapping drill attachment ready for use.

DETAILED DESCRIPTION OF THE PREFERRED EMBODIMENT

Figure 1:
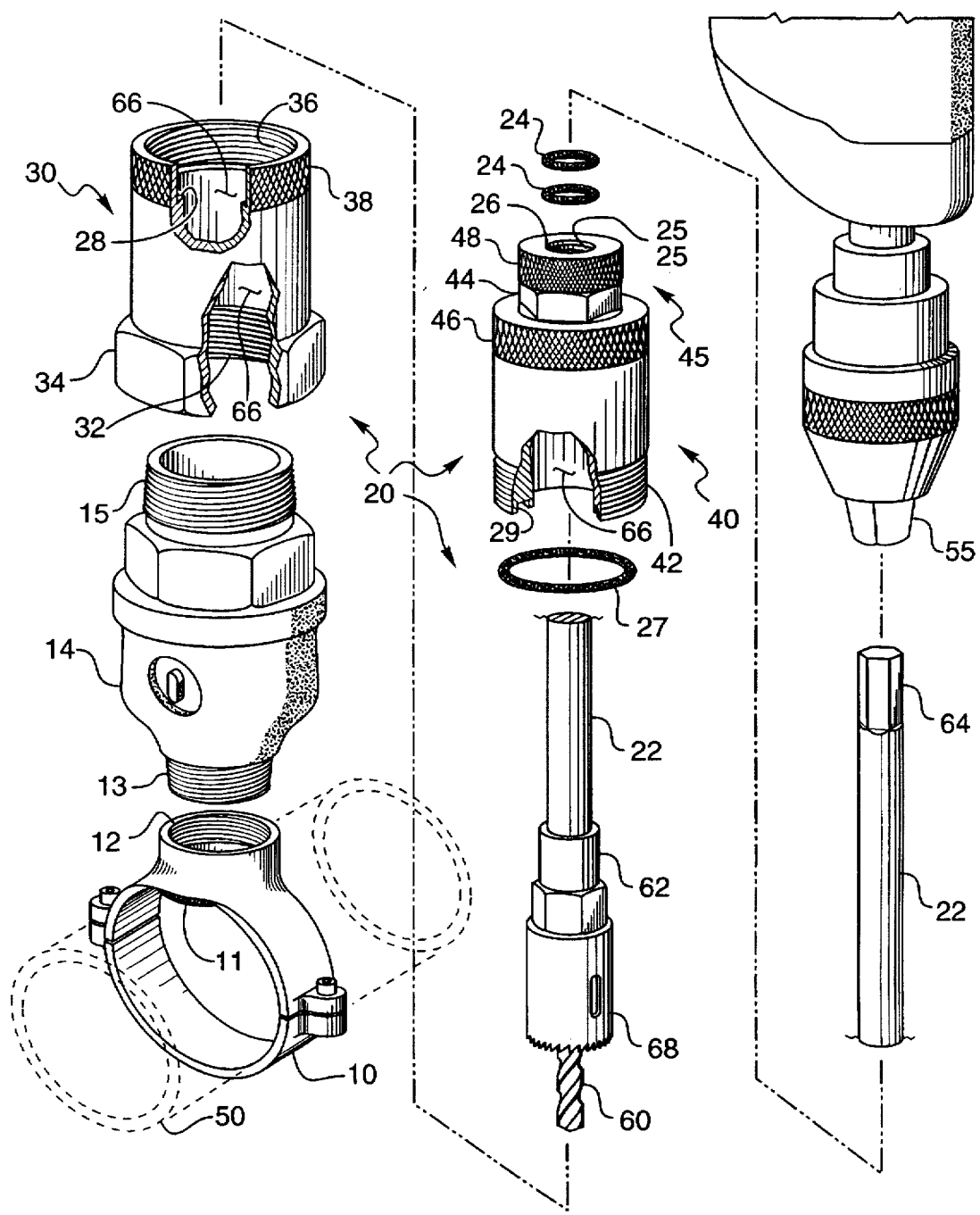
FIG. 1 is an exploded cut away perspective view of the pipe tapping drill attachment, a drill bit and a tapping saddle attached to a pipe.

Referring to the Figures, when it is desired to tap a pressurized fluid main pipe 50 for adding a branch line without interrupting service on the main pipe 50, a tapping saddle 10 is secured to pipe 50. The tapping saddle 10 has seal 11 abutting pipe 10 to make a water tight connection between the pipe 50 and the tapping saddle 10. The tapping saddle 10 has a threaded neck 12. The threaded neck 12 is threaded to a valve 14 having threads 13 at its bottom end and threads 15 at its top end.

The valve 14 is preferably a ball valve. In order to tap pipe 50 the valve 14 is turned to the open position. A pipe tapping drill attachment 20 is attached to the valve 14 by threading top threaded portion 15 of the valve 14 to the threads 32 on the of the lower portion 30 of the pipe tapping drill attachment 20.

Pipe tapping drill attachment 20 has an adapter union portion 30, hereinafter referred to as union, and a gland portion 40. A union portion 30 may be made having several sizes of threaded portion 32 so that union 30 will fit various sizes of valve 14. Threads 36 of union 30 has a standard size, so that threads 36 fit threads 42 of gland 40 of the pipe tapping drill attachment 20.

A hex flats 34 on union 30 of pipe tapping drill attachment 20 are used to tighten or loosen union 30 with a wrench during connection to, or removal from valve 14 or gland 40. Similarly, gland 40 has hex flats 44 for engagement by an open end-end, box, or adjustable wrench.

The threads 36 on union 30 and threads 42 on gland 40 are preferably left handed threads so that the pipe tapping drill attachment 20 will stay connected when threaded to a standard right handed threaded valve 14 when engaging hex flats 34.

Knurls 38 on union 30, and knurls 46 and 48 on gland 40 of the pipe tapping drill attachment 20, facilitate manual assembly and disassembly during use.

Shaft 22 passed though the pipe tapping drill attachment 20. Gland 40 has a neck 45 with a bore 26 which is large enough to snugly admit shaft 22 therethrough, such that dirt and drilling chips will be largely excluded from o-ring seals 24. Shaft 22 may be lubricated to allow freer rotation and axial movement in bore 26. o-ring seals 24 are retained in bore 26 by o-ring groves 25. Internal surfaces of o-rings 24 slidably press the surface of shaft 22 to confine pressurized fluids during tapping. o-ring seal 27 is retained in groove 29 in the end of the wall of gland 40, so that the o-ring 27 presses the o-ring land 28 of union 30 in order to seal the threads 32 and 42 when engaged.

Chamber 66 provides space to contain attachments 60,62 and 68, when shaft 22 is moved to the retracted position, in which position the ball of valve 14 may be rotated without interference.

Shaft 22 has a drill connection 64 preferably a squared receiver for an attachment to a drill 55 for turning shaft 22.

The shaft 22 is held perpendicular to the pipe 50 by the pipe tapping attachment 20 so that hole saw 68, and alternatively, pilot drill bit 60 can cut the pipe 50.

To tap a main pipe 50, shaft 22 is moved axially toward the pipe, moving attachments 60, 62, and 68 from chamber 66 until pilot drill bit 60 engages pipe 50. The user then turns on the hand held drill 55 and applies pressure sufficient to penetrate pipe 50. When an aperture is drilled or sawed in the side of pipe 50, shaft 22 is moved to locate attachments 60, 62 and 68 within chamber 66, permitting valve 14 to be closed without interference.

A preferred embodiment includes pilot drill bit 60 in order to retain the washer slug between pilot 60 and hole saw 68. The slug may then be removed with tapping drill attachment 20, as opposed to remaining in main pipe 50 or the branch pipe.

After closing valve 14, the pipe tapping drill attachment 20 may be unthreaded and a branch pipe attached in its place. Valve 14 may then be opened to fluidly connect the branch without altering pressure in main pipe 50.

Hand held drill 55 is preferably pneumatically, hydraulically or electric battery powered for safe use on water and flammable fluid pipes in case of leaks. Alternatively, a human powered drill may be used.

Union 30 and gland 40 of the pipe tapping drill attachment 20 may be made integral in another preferred embodiment (not illustrated) in which it is desired to attach to a predetermined size of thread 15, thereby reducing cost and complexity.

Union 30 and gland 40 are preferably made from light weight material such as aluminum. Union 30, when connected to gland 40, is preferably made with a length on the order of 24 cm so that access is adequate when the tapped pipe lies in a trench.

Union 30 and gland 40, and alternatively, the integrally made equivalents, may be hard anodized for long life of heavy use without chipping.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An attachment for tapping a pipe comprising:

a housing having an open end with threads on the open end for threadedly connecting the housing to a valve attached to the pipe to be tapped, the housing having a chamber inside, the housing having a hexagonal grip portion for ease of using a wrench to tighten or loosen the housing to the valve, a neck on the housing having a bore therethrough, the bore leading to the chamber in the housing, the neck perpendicular to the pipe to be tapped, a shaft having a first end and a second end, extending through the bore in the housing, the shaft having a diameter and the bore having a diameter which are approximately the same size for a tight fit, such that the shaft may slide and rotate in the bore yet block passage through the bore of water, dirt or other particles, the shaft having a drill bit attached at the first end, in the housing chamber, for drilling a hole in the pipe, at least one o-ring recess in the bore for placing an o-ring therein, an o-ring in each o-ring recess, the o-ring inner diameter approximately the same size as the shaft to seal the bore against water escaping from the chamber, a drill connection portion on the second end of the shaft such that a hand held drill may be attached for rotating the shaft and the drill bit attached thereto, and the shaft may be pushed forward by the user without mechanical assistance for shaft advancement through the housing by pressure applied to the drill while the shaft is rotating to cut a hole in the pipe.

2. An attachment for tapping a pipe as in claim 1 wherein, the housing has an upper portion and a lower portion, the lower portion having threads for threadedly connecting it to the valve, the upper portion having threads and the lower portion having threads for threadedly connecting the lower portion to the upper portion.

3. An attachment for tapping a pipe as in claim 1 wherein, a hole saw is attached to the shaft for cutting a hole in the pipe.

4. An attachment for tapping a pipe as in claim 2 wherein, a hexagonal grip on the lower portion of the housing for allowing a wrench to grip the lower portion.

5. An attachment for tapping a pipe as in claim 2 wherein, a hexagonal grip on the upper portion of the housing for allowing a wrench to grip the upper portion.

6. An attachment for tapping a pipe as in claim 1 wherein, knurling on the housing such that the user can more easily grip the housing.

* * * * *